US008417554B2

(12) United States Patent
Agarwal et al.

(10) Patent No.: US 8,417,554 B2
(45) Date of Patent: Apr. 9, 2013

(54) TOOL FOR MANAGER ASSISTANCE

(75) Inventors: Shivali Agarwal, Ghaziabad (IN); Saeed Bagheri, Croton On Hudson, NY (US); Jarir K. Chaar, Tarrytown, NY (US); Ali Parandehgheibi, Medford, MA (US); Krishna C. Ratakonda, Yorktown Heights, NY (US); Bikram Sengupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/102,203

(22) Filed: May 6, 2011

(65) Prior Publication Data

US 2012/0284078 A1 Nov. 8, 2012

(51) Int. Cl.
*G06Q 10/00* (2012.01)
(52) U.S. Cl. ............... 705/7.14; 705/7.11; 705/7.15; 705/7.13; 705/7.42
(58) Field of Classification Search .......... 705/7.38, 705/7.42, 7.14, 7.15, 7.13, 7.11
See application file for complete search history.

(56) References Cited

U.S. PATENT DOCUMENTS

| | | | | |
|---|---|---|---|---|
| 5,111,391 | A * | 5/1992 | Fields et al. | 705/7.14 |
| 5,918,207 | A | 6/1999 | McGovern et al. | |
| 6,524,109 | B1 * | 2/2003 | Lacy et al. | 434/219 |
| 6,850,895 | B2 * | 2/2005 | Brodersen et al. | 705/7.14 |
| 7,346,542 | B2 | 3/2008 | Suzuki | |
| 7,483,841 | B1 * | 1/2009 | Jin et al. | 705/7.11 |
| 7,885,846 | B2 * | 2/2011 | An et al. | 1/1 |
| 7,945,465 | B2 * | 5/2011 | Theiler | 705/7.13 |
| 7,974,865 | B2 * | 7/2011 | Patnaik et al. | 705/7.12 |
| 8,082,168 | B1 * | 12/2011 | Judy | 705/7.14 |
| 8,099,312 | B2 * | 1/2012 | Jin et al. | 705/7.17 |
| 2001/0042000 | A1 * | 11/2001 | Defoor, Jr. | 705/9 |
| 2002/0029161 | A1 * | 3/2002 | Brodersen et al. | 705/9 |
| 2002/0046074 | A1 * | 4/2002 | Barton | 705/8 |
| 2002/0055870 | A1 * | 5/2002 | Thomas | 705/10 |
| 2002/0077884 | A1 * | 6/2002 | Sketch | 705/12 |
| 2002/0198766 | A1 * | 12/2002 | Magrino et al. | 705/11 |
| 2003/0191680 | A1 * | 10/2003 | Dewar | 705/8 |
| 2004/0162753 | A1 * | 8/2004 | Vogel et al. | 705/10 |

(Continued)

OTHER PUBLICATIONS

D. Kaplan et al., "Fairness Perceptions of Employee Promotion Systems: A Two-Study Investigation of Antecedents and Mediators", Abstract, Journal of Applied Social Psychology, vol. 31, No. 6, pp. 1204-1222, Jun. 2001. (Abstract).
D. Quinn Mills, "Seniority Versus Ability in Promotion Decisions", Industrial and Labor Relations Review, vol. 38, No. 3, Apr. 1985, pp. 421-425.

(Continued)

*Primary Examiner* — Susanna M Meinecke Diaz
*Assistant Examiner* — Jamie Swartz
(74) *Attorney, Agent, or Firm* — John R. Pivnichny; Law Office of Jim Boice (57) ABSTRACT

A computer implemented method, system, and/or computer program product generate an optimal training policy and an optimal promotion policy to accommodate an upcoming project. Required new job positions are identified for an upcoming project. A skillset matrix, which describes a current skill level of each worker in a work unit, and a promotion matrix, which describes historical evaluations of how well each worker achieved predefined goals of past projects, are generated. The skillset matrix is utilized to create an optimal training policy that identifies which workers are in need of additional training in order to qualify for one or more of the identified new job positions, and the promotion matrix is utilized create an optimal promotion policy that identifies which workers will be candidates for being promoted into one or more of the identified said new job positions.

11 Claims, 6 Drawing Sheets

U.S. PATENT DOCUMENTS

| | | | |
|---|---|---|---|
| 2005/0091098 A1* | 4/2005 | Brodersen et al. | 705/8 |
| 2005/0222899 A1* | 10/2005 | Varadarajan et al. | 705/11 |
| 2005/0273381 A1* | 12/2005 | Thomas | 705/11 |
| 2006/0031110 A1* | 2/2006 | Benbassat et al. | 705/9 |
| 2009/0319326 A1* | 12/2009 | Yamada | 705/8 |

OTHER PUBLICATIONS

M. Lemons et al., "Procedural Justice in Promotion Decisions: Using Perceptions of Fairness to Build Employee Commitment", Journal of Managerial Psychology, vol. 16, No. 4, 2001, pp. 268-280.

* cited by examiner

TOOL FOR MANAGER ASSISTANCE

BACKGROUND

The present disclosure relates to the field of computers, and specifically to the use of computers in the field of human resource management and planning. Still more particularly, the present disclosure relates to characterizing workers based on their current skill set, tenure and performance, as well as current job requirements and qualifications for future jobs.

Dynamic management of human resources is an essential part of many business strategies. Two key aspects of human resource management are training and promotion of workers. Training of a worker may be for a specific task or multiple tasks. Promotion of workers may be to a higher level version of a current job held by the worker (e.g. to a job in a more technical/difficult/sensitive area of operations, and thus requiring proficiency in performing higher-order tasks).

BRIEF SUMMARY

A computer implemented method, system, and/or computer program product generate an optimal training policy and an optimal promotion policy to accommodate an upcoming project. Required new job positions are identified for an upcoming project. A skillset matrix, which describes a current skill level of each worker in a work unit, and a promotion matrix, which describes historical evaluations of how well each worker achieved predefined goals of past projects, are generated. The skillset matrix is utilized to create an optimal training policy that identifies which workers are in need of additional training in order to qualify for one or more of the identified new job positions, and the promotion matrix is utilized to create an optimal promotion policy that identifies which workers will be candidates for being promoted into one or more of the identified said new job positions.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
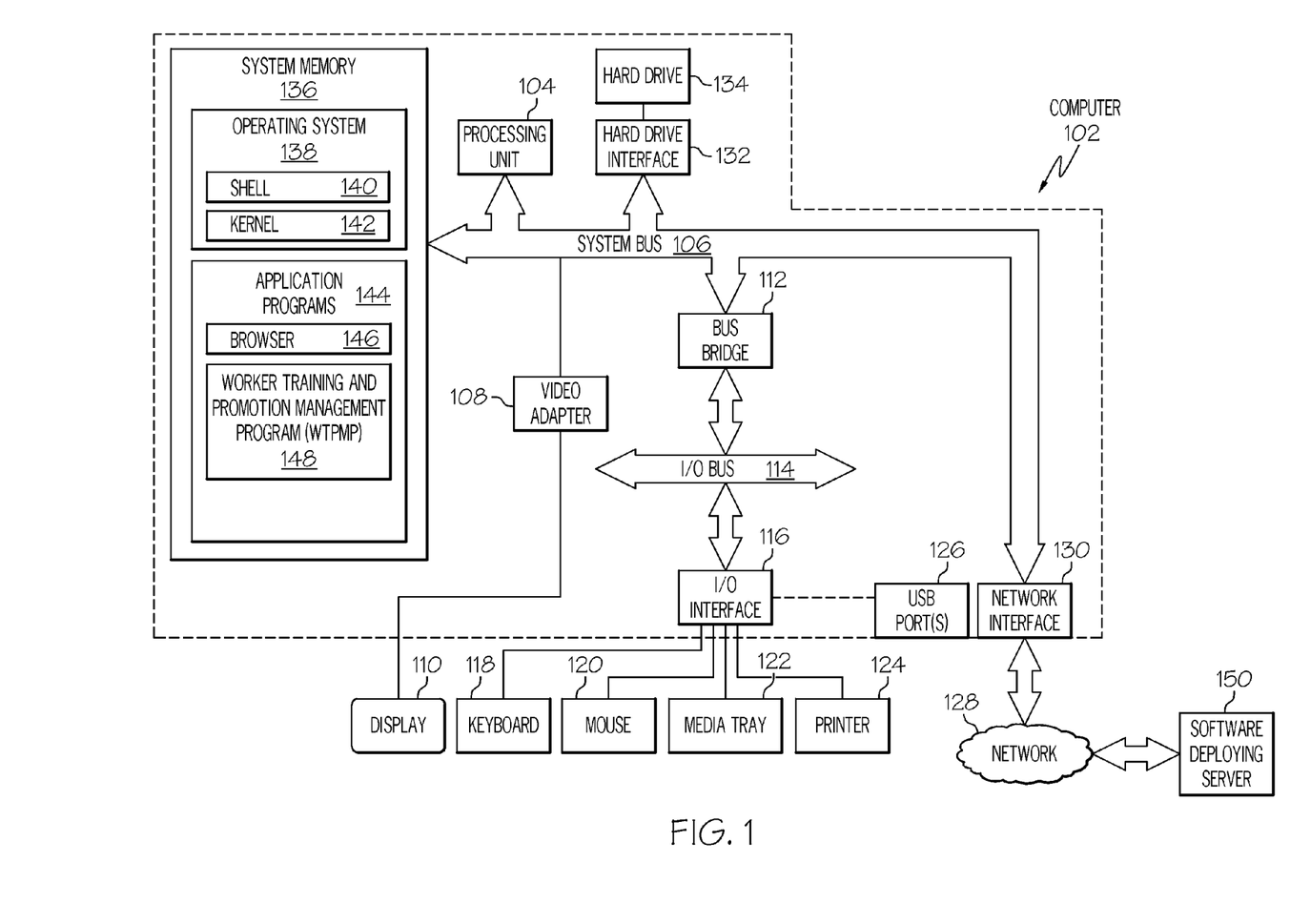
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a worker training and promotion management program (WTPMP) 148. WTPMP 148 includes code for implementing the processes described below, including those described in FIGS. 2-6. In one embodiment, computer 102 is able to download WTPMP 148 from software deploying server 150, including in an on-demand basis, wherein the code in WTPMP 148 is not downloaded until needed for execution to define and/or implement the improved enterprise architecture described herein. Note further that, in one embodiment of the present invention, software deploying server 150 performs all of the functions associated with the present invention (including execution of WTPMP 148), thus freeing computer 102 from having to use its own internal computing resources to execute WTPMP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Dynamic management of human resources is an essential part of many business strategies. The present disclosure focuses on two key aspects of human resource planning: training workers to make them more fit/efficient for the jobs; and selecting workers for promotion. Each of these procedures come with its own cost-benefit trade-offs for the business as a whole.

The first key aspect in human resource planning is worker selection for training. There are two primary types of training: prerequisite and expedition. Prerequisite training is minimum training that is required for a particular job. Thus, jobs of any technical level have a certain "hard" constraint, such that if a worker's skill level is below the requirement for a particular job, training is necessary to meet the minimum requirement of the job. Expedition training, as the name implies, is additional training given to one who is capable of and/or qualified for doing a particular job, but could do that particular job better/faster/cheaper/etc., if given additional expedition training (i.e., training that would expedite the job).

Considering the cost incurred by the training process, training all the workers assigned to a particular type of job may not be economical. It is of particular interest to determine the number (if any) of workers to select for training in a scenario where the properties of the future jobs are not necessarily known, but follow some stochastic behavior. The goal of the present invention is to minimize the total system cost that involves both the training cost as well as penalties incurred by inefficiencies, e.g. lateness, in performing the jobs.

The second key aspect in human resource planning is worker selection for promotion. It may seem intuitive that in order to maximize the productivity of a business unit, the workers should be promoted based on their set of skills and past performance. Nevertheless, many studies demonstrate that employers often promote their workers based on seniority, not ability. At the first glance this may seem to hurt the overall productivity. However, the promotion procedure and its effects on other workers is a far more complicated process. Specifically, how promotions are meted out, and how their distributions are received, are significant factors to the effectiveness of the promotions.

Thus, the present disclosure presents a method and system for human resource planning of the worker selection process for training and promotion. This dynamic resource planning process uses the predictions about the future job requirements based on the information of past job arrivals and properties. For both of the above problems the goal is to make optimal selection of the workers so that the objective function of the system, e.g. minimizing total cost and/or penalties, is achieved.

Figure 2:
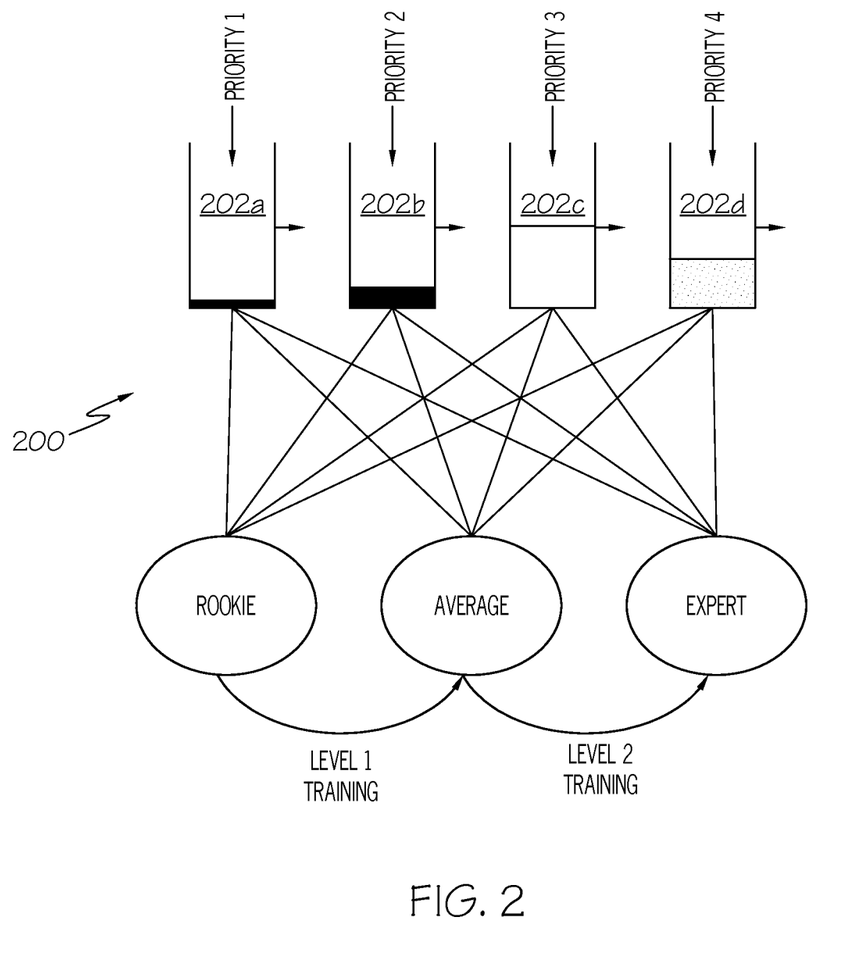
FIG. 2 illustrates a stochastic introduction of work into a system.
Figure 3:
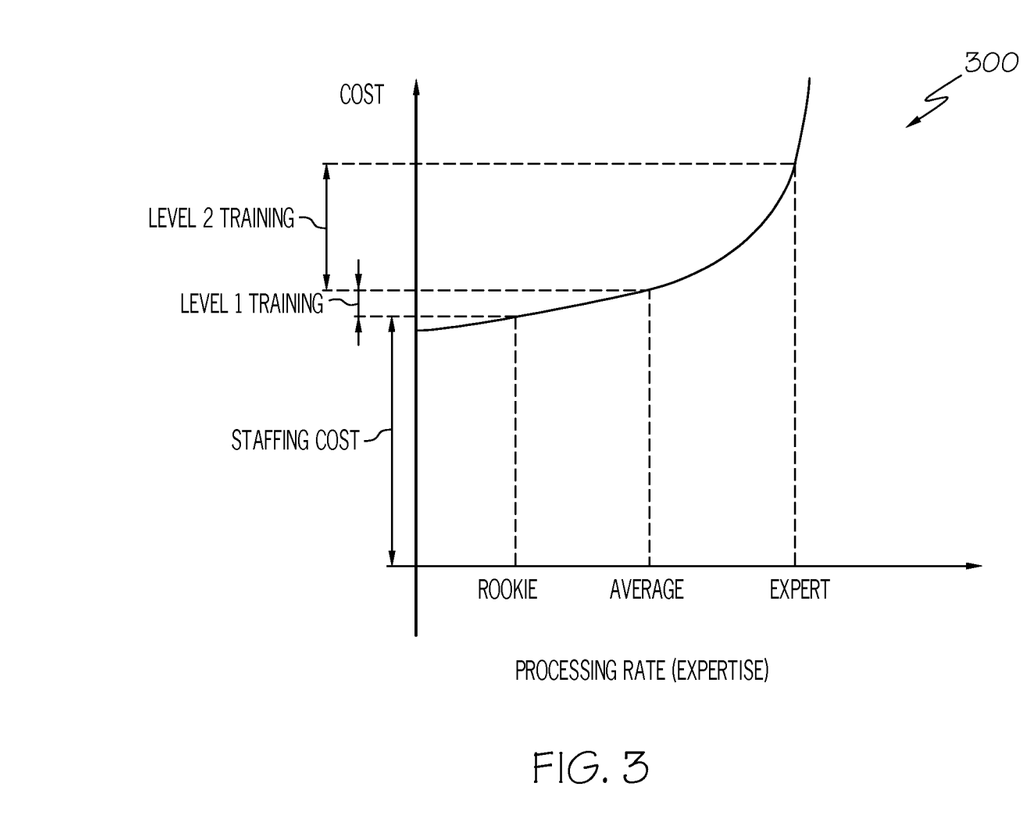
FIG. 3 depicts relative costs of training within an enterprise in accordance with a use case.

With reference now to FIG. 2, a sample model 200 depicts jobs of priorities 1-4 coming into bins 202a-d for execution. Note that all job bins 202a-d require the use of workers having varying levels of expertise, ranging from "rookie" to "average" to "expert", depending on their level of training Work going into each of the bins 202a-d may have different Service Level Agreements (SLAs), deadlines, penalties for lateness, processing times, etc. Assume that all of the work can be done by any class of worker (rookie, average, expert), but that the average worker is faster (e.g., 2×) than the rookie worker, while the expert worker is even faster (e.g., 4×). Thus, the present disclosure aids in determining the optimum mix of expert, average and rookie (if any) workers. As depicted in the graph 300 of FIG. 3, one use case shows that in this case the cost of training a rookie (e.g., bringing on a new hire with no experience in a particular job) is more expensive than training an existing rookie worker up to the level of "average". Furthermore, training an average worker up to the expert level is also more expensive than training a rookie worker up to average. One way to retain such rookie workers in order to give them such training is to properly reward the deserving rookie workers with promotions. A process for recommending such promotion awards to management is discussed in detail below.

Figure 4:
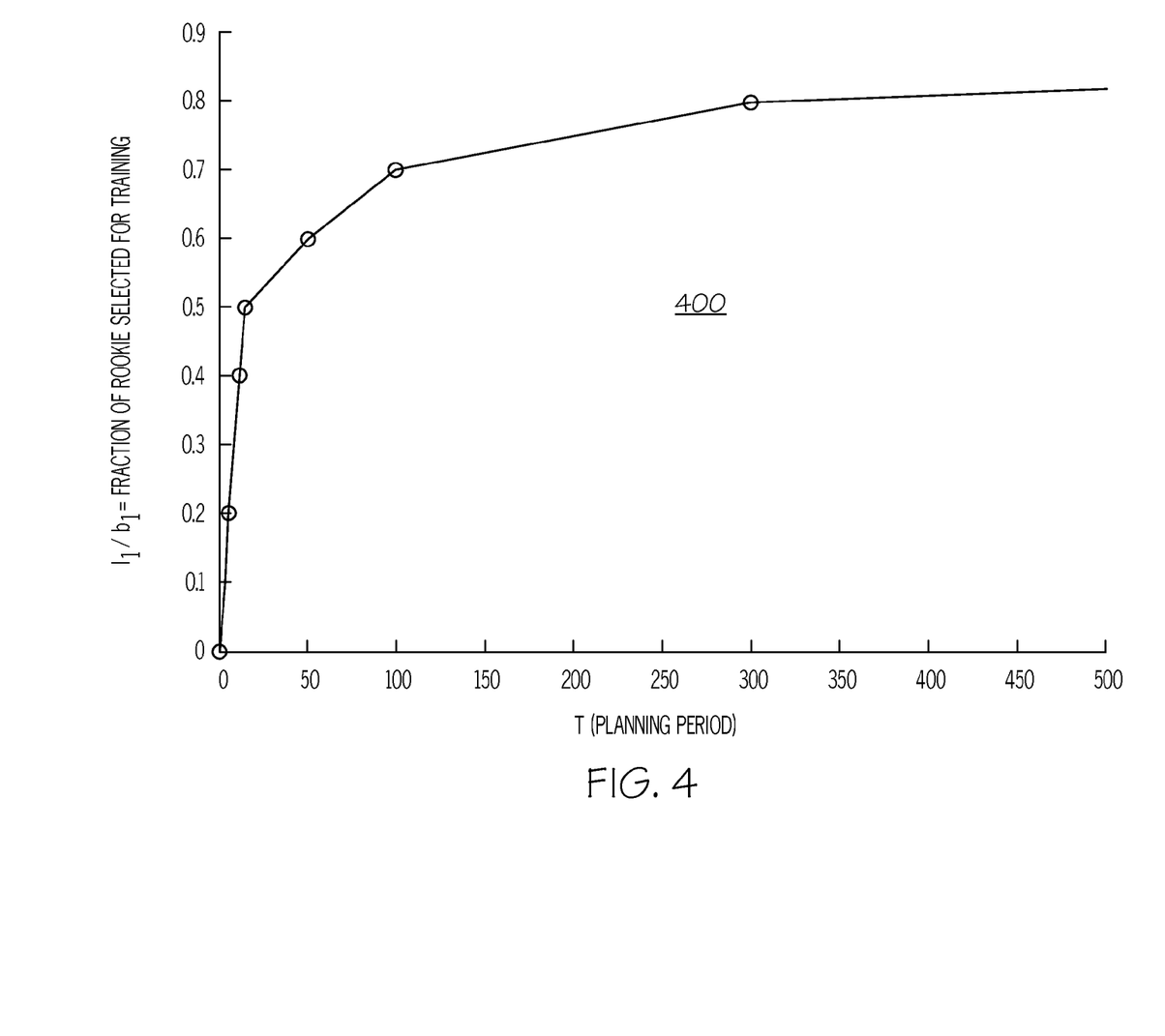
FIG. 4 illustrates time requirements for training new workers in accordance with another use case.

With reference now to FIG. 4, a graph 400 shows one use case in which various percentages of rookie workers are trained up to become average workers. While the planning/training period is minimal up to 50%, if more than half of the rookies are selected for additional training, the cost in time may increase beyond an acceptable level. Reasons for such a shift are described in the formula presented below.

Figure 5A:
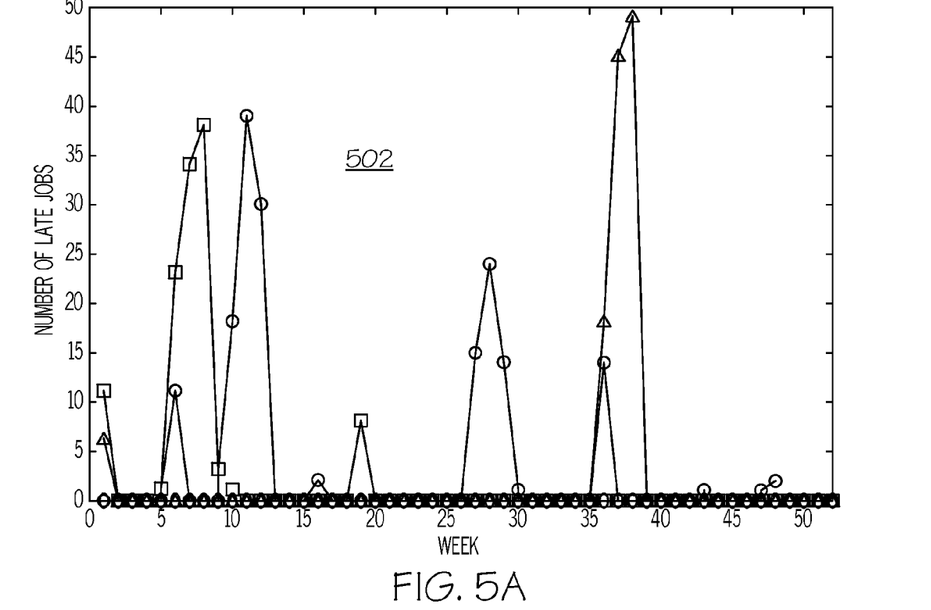
FIG. 5 depicts Service Level Agreement (SLA) penalties experienced by the use case depicted in FIG. 4.
Figure 5B:
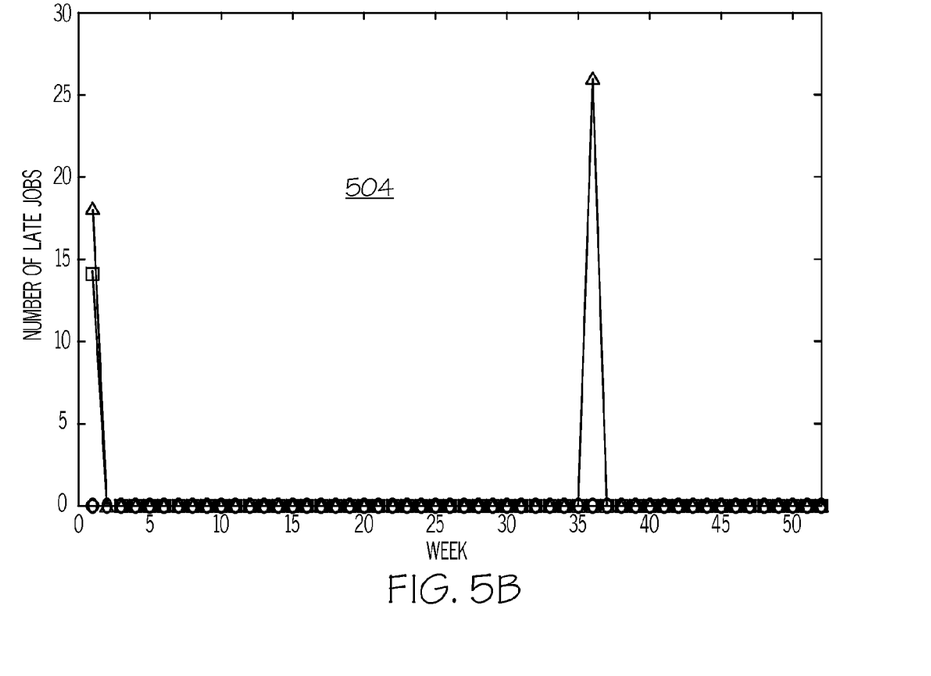

With reference now to FIG. 5, graphs 502 and 504 respectively present hypothetical results of using only rookie workers (graph 502) as compared to using a mix of average workers (¼ of the workforce) and expert workers (¾ of the workforce), as shown in graph 504. Except for the anomaly at week 36, graph 504 shows that there were no late jobs over the course of a year, as composed to regular tardiness when using only rookie workers (graph 502). Thus, even though it is expensive in time and money to train workers up to the expert level, once such level is reached, the SLA penalties may become minimal. Again, this emphasizes the need to retain workers, through the use of appropriate promotions.

The Training Selection Process

In one embodiment, planning the training process is formulated as a discrete-time Markov Decision Process (MDP), in order to characterize an optimal training policy. This discrete-time MDP uses efficiency matrices, which dynamically change with time, to accurately represent the set of resources, e.g. skill levels, possessed by each worker at every period of time. Note that the processing times of the jobs are stochastic, and each element of the efficiency matrix reflects the expected processing time of each type of job by each worker. Thus, if a worker receives training for a particular type of job, his or her expected processing time of that job decreases.

In an exemplary MDP-type equation, in which outcomes are partly random (stochastic receipt of new jobs) and partly under the control of the user (selection of workers for training), let $x_t$ be the optimal training decisions in time period t, where $x_t^{ij}$ denotes the amount of training worker i receives in time period t for a job of type j. Note that $x_t^{ij}$ could be a 0-1 variable which results in a finite action space in each time period. The optimal training policy, denoted by $\pi_t$, is given by the following mapping $$\pi_t:s_t \to x_t \qquad (1)$$

such that it minimizes the following objective function $$E[\Sigma_t C(s_t, x_t)], \qquad (2)$$

where $s_t=(E_t, I_t, f_t)$ denotes the system state in time period t, and $E_t$ is the efficiency matrix at the beginning of time period t, $I_t$ is the backlog information and, $f_t$ contains the job arrival information up to time period t. Further, $C(s_t, x_t)$ denotes the cost function in time period t. Note that the cost function reflects the cost of training as well as other penalties such as missing a deadline for a particular job.

The system state process $s_t$ evolves stochastically according to the following rule $$s_{t+1}=g(s_t, x_t, w_t), \qquad (3)$$

where $w_t$ is a random variable capturing the stochastic evolution of the system when at time period t. The state evolution function g depends on the model to be considered for effectiveness of training.

For example, the evolution of the efficiency matrix can be described as follows:

$$E_{t+1}=E_t+x_t+w_t, \qquad (4)$$

i.e., the efficiency of a particular worker i who has received training for a particular skill of type j in time period t, increases. The exact amount of effectiveness of the training is random, and is captured by the noise term $w_t$. In a more realistic model, the efficiency matrix evolves in a nonlinear fashion, because the marginal effect of several training sessions may decrease over time. Finally, note that the evolution of the backlog and job arrival history can be written in a similar fashion given the distribution of the job arrival process as well as job scheduling decisions in time period t.

Note that the Markov decision process described above can be finite or infinite horizon depending on whether the summation in (2) is a finite or infinite sum.

The set of possible states can also be finite or infinite depending on the set of values that the efficiency matrix $E_t$ can take. For example, if the training decisions $x_t$ or the noise realizations $w_t$ are real valued, then the state space becomes infinite.

The inputs from the user include the initial state (initial efficiency matrix), the cost function in (2) and the evolution of the state space (model for effectiveness of the training process as well as the job arrival distribution).

In one embodiment of the current invention, the above MDP problem is solved numerically using Dynamic Programming or Value Iteration methods. Moreover, constructing simple heuristic algorithms approximately solves this problem.

In one embodiment, the optimal training policy identifies an optimal training candidate by comparing a current tenure period with a current enterprise, a past history of job changes, and an educational history of multiple training candidates in order to determine the optimal training candidate. Thus, if a training candidate has been an worker of the current enterprise for a longer period of time than other training candidates; has a more stable track record with other employers (past history of job changes); and has an education history that matches more closely the proposed training (thus indicating a match in long-term interests), then this training candidate is deemed the optimal training candidate by the optimal training policy.

The Promotion Identification Process

The formulation of a promotion process as an MDP is similar to that of the training process. In this setup $x_t$ denotes promotion decisions in time period t. In order to take into account the perception of fairness, the system state is defined as $s_t=(E_t, I_t, f_t)$, where $E_t=h(E_{t-1}, f_t, x_1, x_2, \ldots, x_{t-1})$ captures the level of commitment (productivity) of the workers as a function of the history of past promotions. In this embodiment, it is assumed that E is such that when a worker gets promoted his or her efficiency/productivity increases, while efficiency/productivity decreases when the worker has not been promoted during past promotion opportunities, despite having the ability to perform the job.

In an exemplary MDP-type equation for the promotion policy, let $p_t$ be the optimal promotion decisions in time period t, where $p_t^{ij}$ denotes the projected promotion a worker i receives in time period t for a job of type j. Note that $x_t^{ij}$ could be a 0-1 variable which results in a finite action space in each time period. An optimal promotion policy, denoted by $\phi_t$, is given by the following mapping $$\phi_t : s_t \to p_t \quad (1)$$

such that it minimizes the following objective function $$E[\Sigma_t C(s_t, x_t)], \quad (2)$$

where $s_t=(E_t, I_t, f_t)$ denotes the system state in time period t, and $E_t$ is the efficiency matrix at the beginning of time period t, $I_t$ is the backlog information and, $f_t$ contains the job arrival information up to time period t. Further, $C(s_t, x_t)$ denotes the cost function in time period t. Note that the cost function reflects the cost of promotions.

The system state process $s_t$ evolves stochastically according to the following rule $$s_{t+1}=g(s_t, x_t, w_t), \quad (3)$$

where $w_t$ is a random variable capturing the stochastic evolution of the system when at time period t. The state evolution function g depends on the model to be considered for effectiveness of a promotion, as identified from past projects by worker evaluations, both by the worker's manager(s) as well as the worker's self-evaluations.

Again, this MDP problem is solved using Dynamic Programming or Value Iteration. The optimal solution of this formulation allows for the automation of the promotion process and the maximization of the productivity of the business as a whole.

Figure 6:
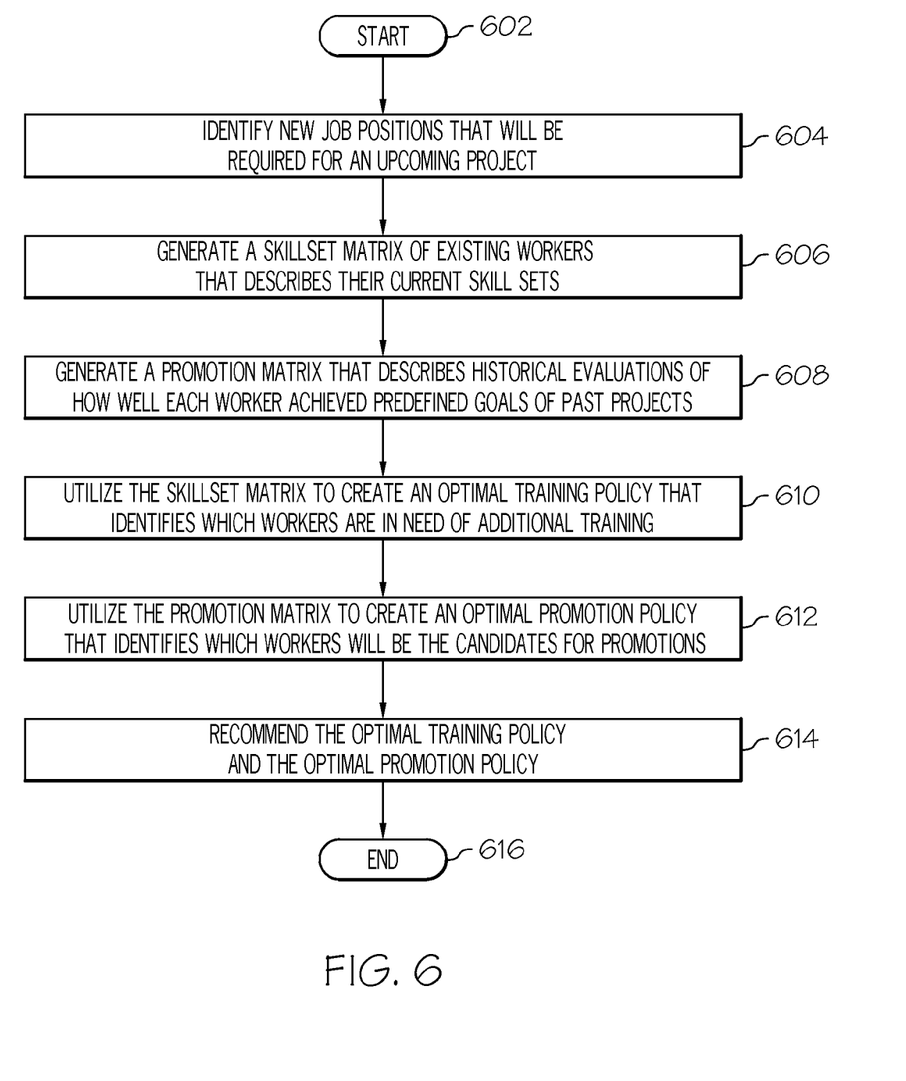
FIG. 6 is a high level flow chart of one or more exemplary steps performed by a processor to predictively manage worker promotion and training.

Referring now to FIG. 6, a high level flow chart of one or more exemplary steps taken by a processor to generate and implement a training policy and a promotion policy for an enterprise to accommodate a future workload is presented. After initiator block 602, a processor identifies new job positions that will be required for an upcoming project (block 604). These new job positions are positions that 1) require higher skill levels than those presently possessed by workers (who therefore need additional training), and 2) require workers to have additional responsibilities in addition to the responsibilities that are currently held (and thus need to be promoted).

As described in block 606, a skillset matrix, which describes a current skill level of each worker in each work unit of a department or enterprise, is then generated. This skillset matrix describes each worker's skills in terms of certifications, titles, internal codes (e.g., a separate code for each worker-possessed skillset, such as a proficiency in writing a certain type of code, ability to operate a particular type of machine, etc.), etc.

As described in block 608, a promotion matrix is generated for each worker. This promotion matrix describes how well each worker achieved predefined goals of past projects. Thus, if a worker has a record (according to manager reviews, peer reviews, self reviews, etc.) of meeting or exceeding expectations for past projects, then he/she would be a stronger candidate for promotion that a worker who has a record of not meeting such goals (e.g., meeting the requirements of a service level agreement (SLA) for a project, coming in on time, coming in under budget, etc.).

As described in block 610, the skillset matrix described in block 606 is then used to create an optimal training policy that identifies which workers are in need of additional training in order to qualify for one or more of the identified new job positions. In one embodiment, the processor establishes this optimal training policy $\pi_t$ by mapping $\pi_t : s_t \to x_t$ in order to maximize $E[\Sigma_t C(s_t, x_t)]$, where $s_t=(E_t, I_t, f_t)$ denotes a system state in time period t, $E_t$ is an efficiency matrix at a beginning of time period t, $I_t$ is a backlog information, $f_t$ contains job arrival information up to time period t, $C(s_t, x_t)$ denotes a cost function in time period t, and a system state process $s_t$, and an amount of training $x_t$ evolves stochastically according to $s_{t+1}=g(s_t, x_t, w_t)$, where $w_t$ is a random variable capturing a stochastic evolution of a system at time period t.

As described in block 612, the promotion matrix is utilized to create an optimal promotion policy that identifies which workers will be best candidates for being promoted into one or more of the identified said new job positions. In one embodiment, this optimal promotion policy $\phi_t$ is established by mapping $\phi_t : s_t \to p_t$ in order to maximize $E[\Sigma_t C(s_t, x_t)]$, where $s_t=(E_t, I_t, f_t)$ denotes a system state in time period t, $E_t$ is an efficiency matrix at a beginning of time period t, $I_t$ is a backlog information, $f_t$ contains job arrival information up to time period t, where $p_t$ are optimal promotion decisions in time period t, where $C(s_t, x_t)$ denotes a cost function in time period t for a system state process $s_t$.

As described in block 614, the optimal training policy and the optimal promotion policy are then recommended to management. The process ends at terminator block 616.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of generating and implementing an optimal training policy and an optimal promotion policy to accommodate an upcoming project, the computer implemented method comprising:
   a processor identifying new job positions that will be required for an upcoming project;
   the processor generating a skillset matrix that describes a current skill level of each worker in a work unit;
   the processor generating a promotion matrix that describes historical evaluations of how well each worker achieved predefined goals of past projects;
   the processor utilizing the skillset matrix to create an optimal training policy that identifies which workers are in need of additional training in order to qualify for one or more of the identified new job positions, wherein the optimal training policy is denoted as $\pi_t$, and wherein the computer implemented method further comprises:
   the processor establishing the optimal training policy $\pi_t$ by mapping $\pi_t: s_t \to x_t$ in order to maximize $E[\Sigma_t C(s_t, x_t)]$, where $s_t=(E_t, I_t, f_t)$ denotes a system state in time period t, $E_t$ is an efficiency matrix at a beginning of time period t, $I_t$ is a backlog information, $f_t$ contains job arrival information up to time period t, $C(s_t, x_t)$ denotes a cost function in time period t, and a system state process $s_t$, and an amount of training $x_t$ evolves stochastically according to $s_{t+1}=g(s_t, x_t, w_t)$, where $w_t$ is a random variable capturing a stochastic evolution of a system at time period t;
   the processor utilizing said promotion matrix to create an optimal promotion policy that identifies which workers will be candidates for being promoted into one or more of the identified new job positions; and
   the processor recommending the optimal training policy and the optimal promotion policy to management.

2. The computer implemented method of claim 1, further comprising:
   the processor establishing an efficiency of a specific worker according to a formula $E_{t+1}=E_t+x_t+w_t$, wherein an efficiency $E_t$ of the specific worker i who has received training $x_t$ for a particular skill of type j in time period t, increases, and wherein an exact amount of effectiveness of the training is a random value that is captured by a noise term $w_t$.

3. The computer implemented method of claim 1, wherein the optimal promotion policy is denoted as $\phi_t$, the computer implemented method further comprising:
   the processor establishing the optimal promotion policy $\phi_t$ by mapping $\phi_t: s_t \to p_t$ in order to maximize $E[\Sigma_t C(s_t, x_t)]$, where $s_t=(E_t, I_t, f_t)$ denotes a system state in time period t, $E_t$ is an efficiency matrix at a beginning of time period t, $I_t$ is a backlog information, $f_t$ contains job arrival information up to time period t, where $p_t$ are optimal promotion decisions in time period t, where $C(s_t, x_t)$ denotes a cost function in time period t for a system state process $s_t$.

4. The computer implemented method of claim 1, wherein the optimal training policy identifies an optimal training candidate by comparing a current tenure period with a current enterprise, a past history of job changes, and an educational history of multiple training candidates in order to determine the optimal training candidate.

5. A computer program product for generating and implementing an optimal training policy and an optimal promotion policy to accommodate an upcoming project, the computer program product comprising:
   a non-transitory computer readable storage media;
   first program instructions to identify new job positions that will be required for an upcoming project;
   second program instructions to generate a skillset matrix that describes a current skill level of each worker in a work unit; third program instructions to generate a promotion matrix that describes historical evaluations of how well each worker achieved predefined goals of past projects;
   fourth program instructions to utilize the skillset matrix to create an optimal training policy that identifies which workers are in need of additional training in order to qualify for one or more of the identified new job positions;

fifth program instructions to utilize said promotion matrix to create an optimal promotion policy that identifies which workers will be candidates for being promoted into one or more of the identified new job positions, wherein the optimal promotion policy is denoted as $\phi_t$, and wherein the fifth program instructions, when further executed, establish the optimal promotion policy $\phi_t$ by mapping $\phi_t : s_t \to p_t$ in order to maximize $E[\Sigma_t C(s_t, x_t)]$, where $s_t = (E_t, I_t, f_t)$ denotes a system state in time period t, $E_t$ is an efficiency matrix at a beginning of time period t, $I_t$ is a backlog information, $f_t$ contains job arrival information up to time period t, where $p_t$ are optimal promotion decisions in time period t, where $C(s_t, x_t)$ denotes a cost function in time period t for a system state process $s_t$; and sixth program instructions to recommend the optimal training policy and the optimal promotion policy to management; and wherein the first, second, third, fourth, fifth, and sixth program instructions are stored on the non-transitory computer readable storage media for execution by a computer.

6. The computer program product of claim 5, wherein the optimal training policy is denoted as $\pi_t$, and wherein the computer program product further comprises:

seventh program instructions to establish the optimal training policy by mapping $\pi_t : s_t \to x_t$ in order to maximize $E[\Sigma_t C(s_t, x_t)]$, where $s_t = (E_t, I_t, f_t)$ denotes a system state in time period t, $E_t$ is an efficiency matrix at a beginning of time period t, $I_t$ is a backlog information, $f_t$ contains job arrival information up to time period t, $C(s_t, x_t)$ denotes a cost function in time period t, and a system state process $s_t$, and an amount of training $x_t$ evolves stochastically according to $s_{t+1} = g(s_t, x_t, w_t)$, where $w_t$ is a random variable capturing a stochastic evolution of a system at time period t; and wherein the seventh program instructions are stored on the computer readable storage media.

7. The computer program product of claim 6, further comprising:

eighth program instructions to establish an efficiency of a specific worker according to a formula $E_{t+1} = E_t + x_t + w_t$, wherein an efficiency $E_t$ of the specific worker i who has received training $x_t$ for a particular skill of type j in time period t, increases, and wherein an exact amount of effectiveness of the training is a random value that is captured by a noise term $w_t$; and wherein the eighth program instructions are stored on the computer readable storage media.

8. A computer system comprising: a central processing unit (CPU), a computer readable memory, and a non-transitory computer readable storage media;

first program instructions to identify new job positions that will be required for an upcoming project;

second program instructions to generate a skillset matrix that describes a current skill level of each worker in a work unit;

third program instructions to generate a promotion matrix that describes historical evaluations of how well each worker achieved predefined goals of past projects;

fourth program instructions to utilize the skillset matrix to create an optimal training policy that identifies which workers are in need of additional training in order to qualify for one or more of the identified new job positions;

fifth program instructions to utilize said promotion matrix to create an optimal promotion policy that identifies which workers will be candidates for being promoted into one or more of the identified new job positions, wherein the optimal promotion policy is denoted as $\phi_t$, and wherein the fifth program instructions, when further executed, establish the optimal promotion policy $\phi_t$ by mapping $\phi_t : s_t \to p_t$ in order to maximize $E[\Sigma_t C(s_t, x_t)]$, where $s_t = (E_t, I_t, f_t)$ denotes a system state in time period t, $E_t$ is an efficiency matrix at a beginning of time period t, $I_t$ is a backlog information, $f_t$ contains job arrival information up to time period t, where $p_t$ are optimal promotion decisions in time period t, where $C(s_t, x_t)$ denotes a cost function in time period t for a system state process $s_t$; and sixth program instructions to recommend the optimal training policy and the optimal promotion policy to management; and wherein the first, second, third, fourth, fifth, and sixth program instructions are stored on the computer readable storage media for execution by the CPU via the computer readable memory.

9. The computer system of claim 8, wherein the optimal training policy is denoted as $\pi_t$, and wherein the system further comprises:

seventh program instructions to establish the optimal training policy by mapping $\pi_t : s_t \to x_t$ in order to maximize $E[\Sigma_t C(s_t, x_t)]$, where $s_t = (E_t, I_t, f_t)$ denotes a system state in time period t, $E_t$ is an efficiency matrix at a beginning of time period t, $I_t$ is a backlog information, $f_t$ contains job arrival information up to time period t, $C(s_t, x_t)$ denotes a cost function in time period t, and a system state process $s_t$, and an amount of training $x_t$ evolves stochastically according to $s_{t+1} = g(s_t, x_t, w_t)$, where $w_t$ is a random variable capturing a stochastic evolution of a system at time period t; and wherein the seventh program instructions are stored on the computer readable storage media for execution by the CPU via the computer readable memory.

10. The computer system of claim 9, further comprising:
eighth program instructions to establish an efficiency of a specific worker according to a formula $E_{t+1} = E_t + x_t + w_t$, wherein an efficiency $E_t$ of the specific worker i who has received training $x_t$ for a particular skill of type j in time period t, increases, and wherein an exact amount of effectiveness of the training is a random value that is captured by a noise term $w_t$; and wherein the eighth program instructions are stored on the computer readable storage media for execution by the CPU via the computer readable memory.

11. The computer system of claim 8, wherein the optimal training policy identifies an optimal training candidate by comparing a current tenure period with a current enterprise, a past history of job changes, and an educational history of multiple training candidates in order to determine the optimal training candidate.

* * * * *